INVENTOR.
CHARLES E. COLE
BY
ATTORNEY

INVENTOR.
CHARLES E. COLE
BY Herbert L. Davis
ATTORNEY

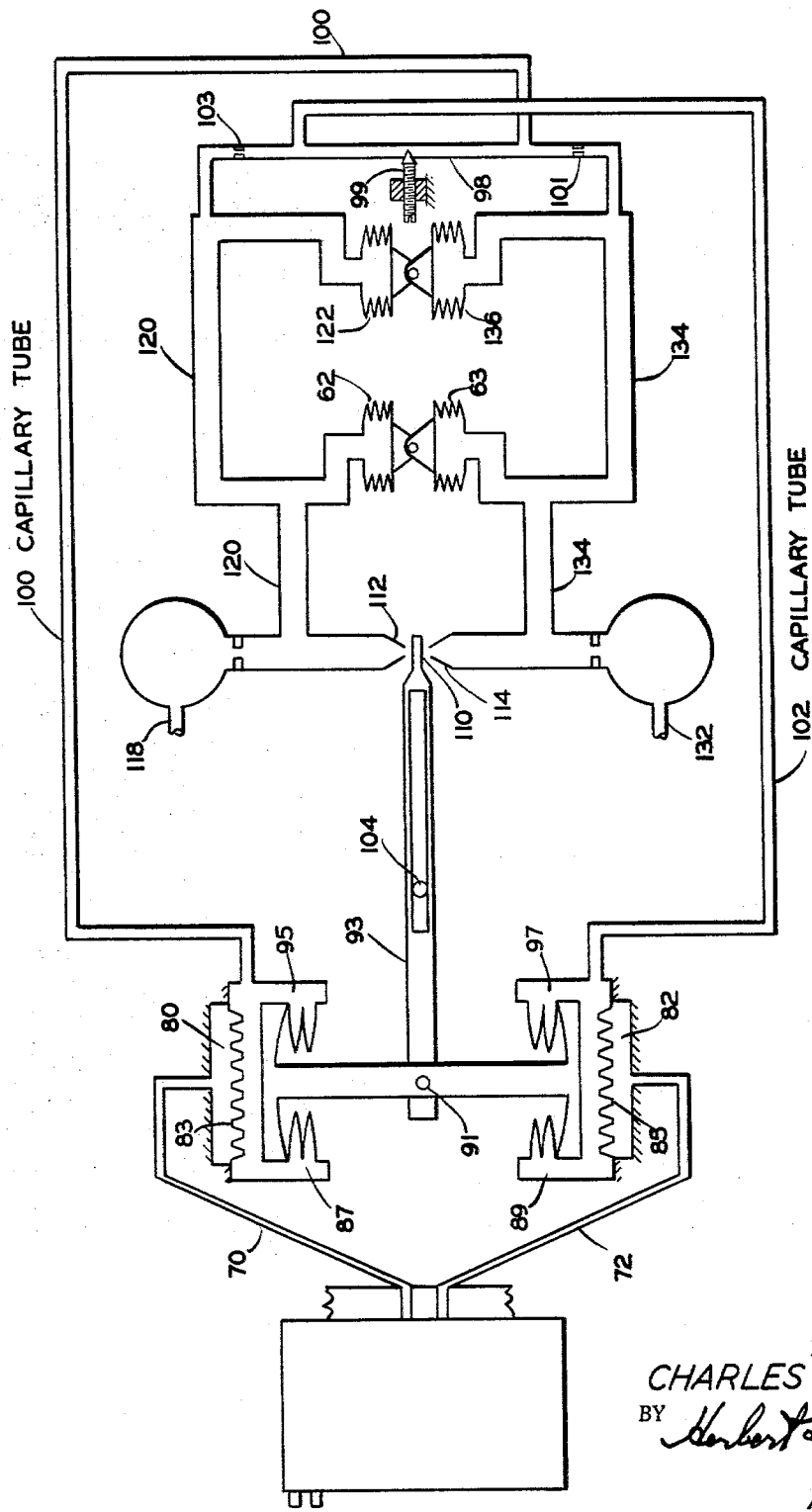

United States Patent Office 3,250,498
Patented May 10, 1966

3,250,498
NULL SHIFT CORRECTOR CIRCUIT FOR A FLUID
PRESSURE OPERATED CONTROL DEVICE
Charles E. Cole, Tenafly, N.J., assignor to The Bendix
Corporation, Teterboro, N.J., a corporation of Delaware
Filed Apr. 15, 1963, Ser. No. 273,238
4 Claims. (Cl. 244—78)

The present invention relates to improvements in a control device including a fluid pressure operated network and signal amplification means together with a novel null shift corrector mechanism for use in a flight stabilization system applicable to aircraft and outer space vehicles. More particularly, the invention relates to a control device which includes a novel compensating mechanism applicable to correct for steady state inequalities in null pressure values in the output stage of the control device as well as to filter or "wash out" steady state rate signals (low frequency signals) such as might be associated with a flight turn maneuver of an aircraft or outer space vehicle with which the subject control device is cooperatively arranged.

Furthermore, the invention in the provision of the novel compensating mechanism relates to improvements in a control device of a type disclosed and claimed in Patent No. 3,180,592 which was U.S. Application Serial No. 186,252, filed April 9, 1962, by Edward J. Jeye, Robert H. Bosworth, Ben C. Nichols, and Raymond F. Kaczynski, and assigned to The Bendix Corporation.

As explained in the last-mentioned U.S. application, such fluid pressure operated control devices, utilizing hot and cold gases, find increasing application in the control of missiles and spacecraft. Extensive studies in hot gas controls have led to the development of techniques that provide unprecedented degrees of mission reliability in aerodynamic surface actuation, space orientation and stabilization, power generation and utilization, and conversion devices.

An object of the invention is to provide such a control device including an improved compensating mechanism operatively connected to the input and output stages of the control device so as to compensate for steady state inequalities in null pressure values in the output stage as well as wash out steady state rate signals (low frequency signals) acting on the input stage.

Another object of the invention is to provide a control device in which the cavities of bellows in an input stage of the control device are pressurized through suitable capillary tubing connected to output stage signal ports in an inverse, negative or degenerative feedback arrangement such as to cause the bellows to actuate the control device to effectively compensate for steady state inequalities in null pressure values in the output stage of the control device as well as to filter or "wash out" steady state rate signals (low frequency signals) acting on the input stage and such as might be associated with a flight turn maneuver of the aircraft or outer space vehicle.

Another object of the invention is to provide a rate gyro operated fluid pressure control device in which the transfer function of the device acting in response to fluid pressure signals from the gyro is such as to "wash out" relatively low frequency steady state rate signals associated with turn maneuvers of an aircraft or outer space vehicle while the control device is further so arranged in relation to the output stage thereof as to provide the additional function of compensating for steady state inequalities in the null pressure values in the output stage of the control device; the control device being further effective to attenuate relatively high frequency signals arising from vehicle structural coupling with the controlling rate gyro and operatively effective between the low frequency "wash out" range and the high frequency attenuation range to provide in an intermediate frequency signal range high gain output signals.

Another object of the invention is to provide a novel fluid pressure operated rate gyroscope signal receiving control device in which the foregoing is effected by the provision of a pair of diaphragms having variable volume chambers cooperatively arranged in relation thereto and responsive to a sensed fluid pressure rate signal to transmit a force corresponding to the sensed signal through fluid medium in the variable volume chambers so as to operate a flapper valve controlling fluid pressure applied to output stage signal ports of the control device, suitable capillary tubes being connected between the variable volume chambers and the output stage signal ports so as to provide a fluid pressure feedback to the variable volume chambers which so acts therein and on the flapper valve as to compensate for steady state inequalities in null pressure values at the output stage signal ports, the fluid pressure medium being supplied to the variable volume chambers by the capillary tubes at a relatively constant fluid pressure so as to be effective to filter or "wash out" relatively low frequency steady-state rate signals such as might be associated with a flight turn maneuver of an aircraft or outer space vehicle, while such fluid pressure medium is also effective to transmit rate signals of relatively high frequency applied thereto by the diaphragms for operating the flapper valve, the flapper valve being so arranged as to effectively attenuate those extremely high frequency rate signals such as might arise from structural coupling within the body of the aircraft or outer space vehicle, while the operation of the flapper valve through the fluid pressure medium provides high gain output signals in response to rate signals of a normal frequency control range intermediate the low frequency "wash out" range and the high frequency attenuation ranges.

Another objects of the invention is to provide such a control device including means for adjusting the gain of the feedback effected through the capillary tubes by providing a variable interconnecting orifice.

Another object of the invention is to provide such a control device in which the transmission of input signals is not affected by the connection through suitable capillary tubes of the input and output stages of the control device due to the band-pass, filter design of the control device; low frequency input signals are attenuated by the "wash out" characteristic obtained by venting the bellows cavities to the common pressure source at the output signal stage and consequently is not affected by the equalization of the steady state inequalities in the null pressure values in the output signal stage of the control device; and high frequency input signals are isolated from the common pressure source at the output signal stage by the fluid resistance of the capillary vent tubes and are isolated from variable output signal pressures at the output signal stage by the fluid resistance of such capillary tubes.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:
FIGURE 1 is a diagrammatic view of a part of a hot gas flight stabilization system in which there is shown in operative relation a control mechanism embodying the subject matter of the invention.

FIGURE 4 is a diagrammatic view of the improved compensating mechanism embodying the invention in which corresponding parts to those shown in FIGURES 1 and 2 have been indicated by like numerals.

In order that the invention may be more clearly understood, an operative system such as described and claimed in the aforenoted U.S. Patent No. 3,180,592 and to which the invention may be applied is described hereinafter with reference to FIGURES 1 and 2.

Figure 1:
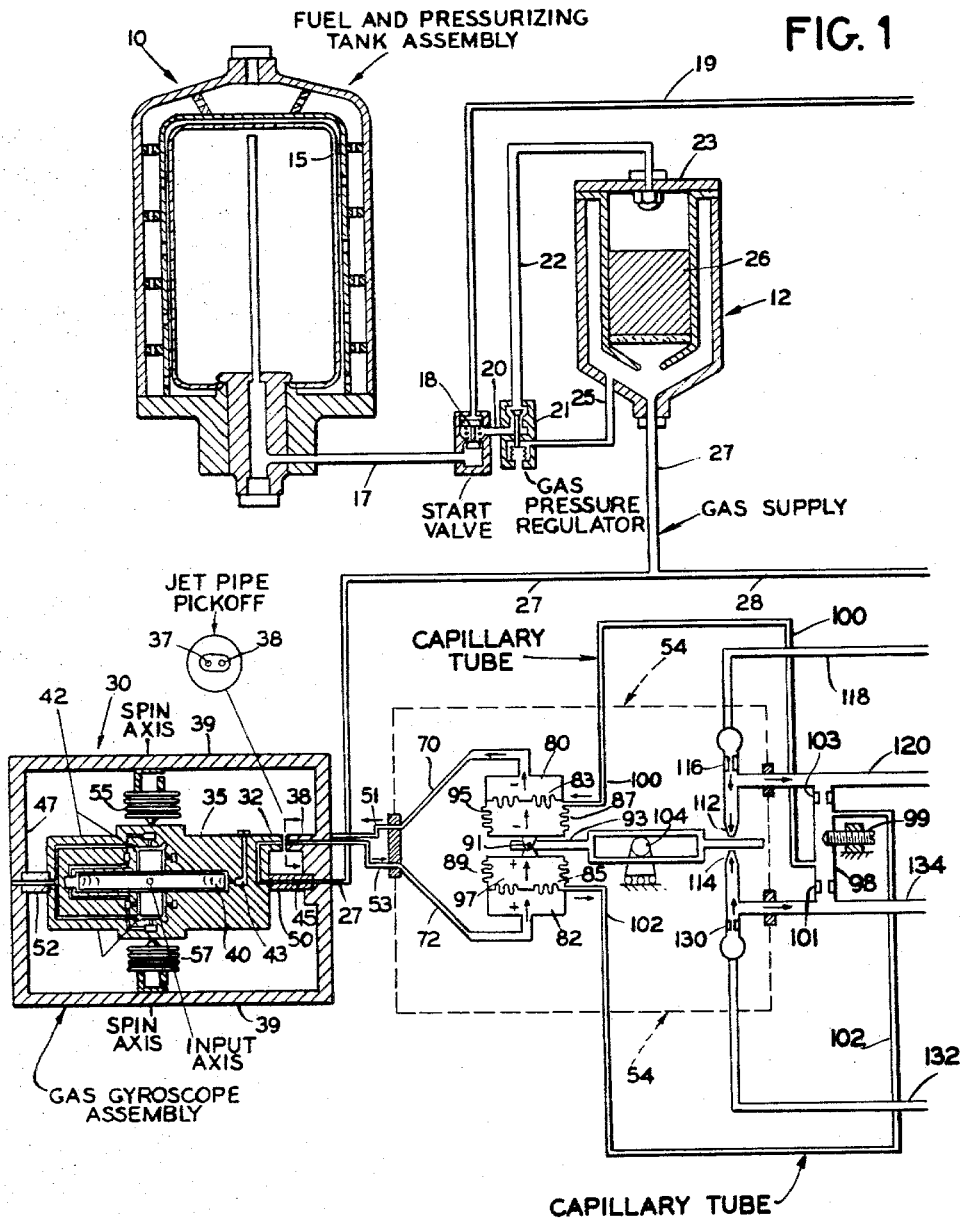
Figure 2:
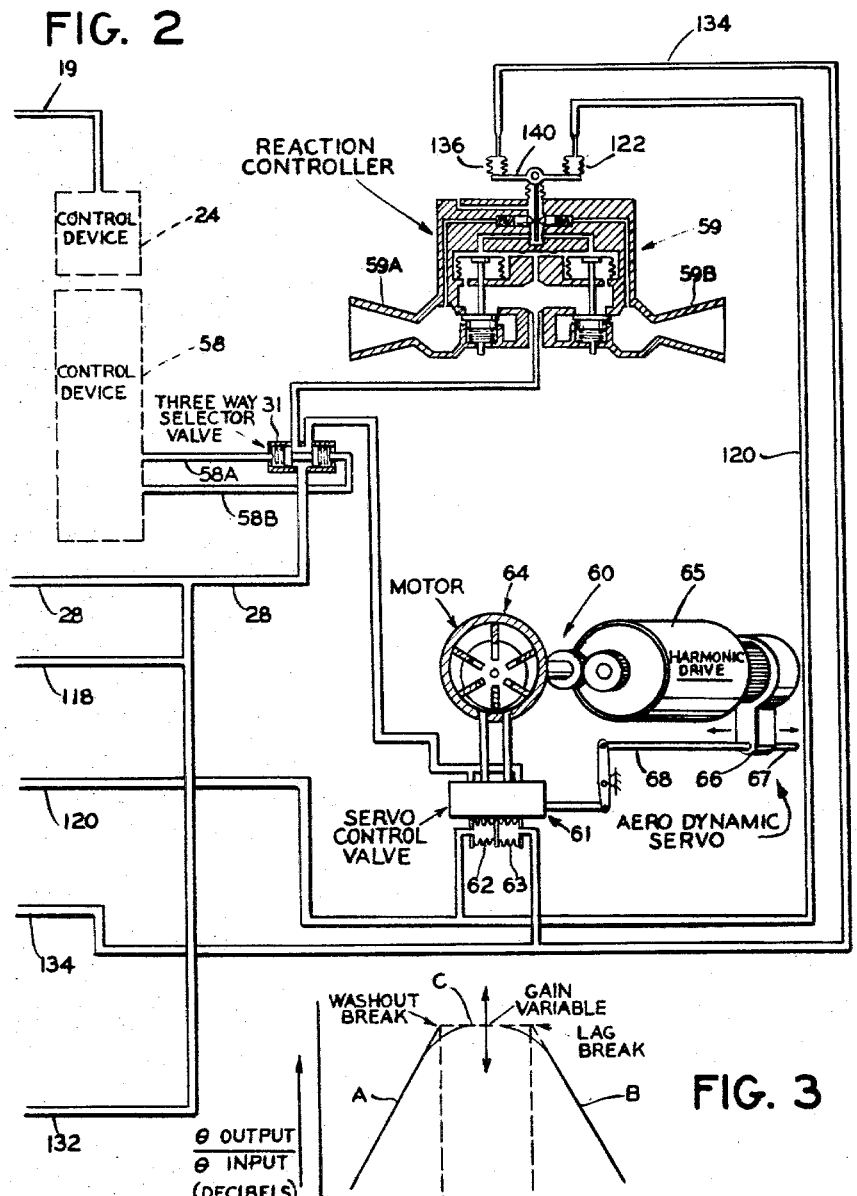
FIGURE 2 is a diagrammatic view of a second part of the hot gas flight stabilization system of FIGURE 1.

Referring to the drawings of FIGURES 1 and 2, there is shown a hot gas stabilization system in which there is provided a fuel tank 10 in which the fuel pressure may be allowed to decay during the duty cycle, but in which the generated gas pressure may be maintained at a constant level of, for example, 600±30 p.s.i.g. by metering the flow of liquid fuel to a gas generator and accumulator assembly indicated by the numeral 12.

The fuel tank 10 may be of a conventional type including an expulsion bladder 15 containing a suitable fuel such as hydrogen peroxide. The tank 10 may be pressurized by a suitable gas such as nitrogen gas to an initial pressure of 1,800 p.s.i.g. The liquid hydrogen peroxide contained in the bladder 15 may then be applied under the pressure of the nitrogen gas in the container 10 to an output line 17 controlled by a start valve 18 operated through a control conduit 19. Upon the start valve 18 being opened, the liquid hydrogen peroxide under the pressure of the nitrogen gas will then flow through a conduit 20 and a gas pressure regulator (peroxide metering valve) indicated by the numeral 21 to a conduit 22 leading to the inlet 23 of the gas generator 12.

The start valve 18 may operate in response to an external command signal or fluid pressure applied through the conduit 19 from an outside source or suitable control device 24. The gas pressure regulator 21 will control the amount of hydrogen peroxide flowing through conduit 22 into the gas generator 12 in response to the controlling gas outlet pressure from the gas generator and accumulator assembly 12 applied through a conduit 25.

The liquid hydrogen peroxide applied to the gas generator 12 may be decomposed in a silver screen catalyst bed 26 into oxygen and superheated steam having a temperature of approximately 1400° F. The decomposed hydrogen peroxide then flows through an output line 27 from the generator and accumulator assembly 12 to a rate gyroscope indicated generally by the numeral 30 and through an output line 28 to a three-way selector valve 31, as hereinafter explained.

The output line 27 connnected to the rate gyroscope 30 opens at a pipe nozzle 32 attached to a gimbal provided by a rotor housing 35 of the rate gyro 30 and operatively positioned in relation to two (2) jet pipe receiver orifices 37 and 38 projecting from an interior surface of the sealed casing 39 of the rate gyro 30.

The jet pipe nozzle 32 and receiver orifices 37 and 38 may be of a conventional type such as shown, for example, by Wunsch et al. U.S. Patent No. 2,345,169, granted March 28, 1944.

*Hot gas rate gyro*

The gyro assembly 30 is an all gas pressure operated rate gyroscope which may operate under extremely high temperature conditions without any energy source other than the supply gas and may be of a type disclosed in greater detail and claimed in a U.S. application Serial No. 189,144 filed April 20, 1962 by George M. Thomson and James S. Malcolm, and assigned to The Bendix Corporation. Hot gas flight stabilization systems of the aforenoted type are applicable to any type of vehicle including space vehicles subject to high temperature operating environments.

The gyroscope assembly 30 may include a turbine driven rotor 40 which rotates on gas bearings 42, as shown in FIGURE 1, and which may be mounted in the housing 35. The housing 35 has an inlet passage 45 and an outlet passage 47 extending through torsion tubes 50 and 52 which also act as the spring restraint for the rotor housing or enclosure 35 and may be of conventional type. (An alternate design may utilize one hollow torsion tube and one hollow pivot suspended on a gas bearing.) The gimbal motion of the rotor housing 35 is indicated by the jet pipe nozzle 32 projecting from the housing 35 and the position thereof relative to two (2) jet pipe receiver orifices 37 and 38 projecting from the interior surface of the casing 39. Gimbal motion of the rotor housing 35 is damped by two (2) opposing bellows-orifice combinations 55 and 57. The entire mechanism is contained in the sealed casing 39 with inlet connection 45 and exhaust connection 47 for the energizing gas and the conduits 51 and 53 leading from the jet pipe receiver orifices 37 and 38, respectively, to a control mechanism 54.

In the operation of the hot gas rate gyroscope 30, shown in FIGURE 1, hydrogen peroxide gas, under pressure and applied through conduit 27 and inlet passage 45 in torsion tube 50 is applied through the jet pipe nozzle 32 projecting from the gyro rotor housing 35. Any motion of housing 35 is detected by means of the differential pressure effected between the two jet pipe receiver orifices 37 and 38 by the adjusted position of the jet pipe nozzle 32 in relation thereto. The gas is then accumulated in the gyroscope case 39 and is bled into the turbine or gyroscope rotor wheel 40 and gas bearing cavities 42 through a passage 43 so as to rotate the gyroscope rotor wheel 40 and energize the gas bearings 42 on which the rotor wheel 40 is suspended.

The rotation of the rotor wheel 40 effects an angular momentum about the spin axis of the gyroscope rotor 40 which, in turn, creates a gyroscopic torque about the output axis when an angular velocity is applied about the input axis. This torque produces gimbal motion about the output axis which is restrained by the torsion tube or tubes 50 and 52 and is indicated by the adjusted position of the jet pipe nozzle 32 relative to the receiver orifices 37 and 38, as previously described.

Undesirable oscillatory motions of the gimbal or rotor housing 35 are damped by two (2) opposing bellows-orifice combinations 55 and 57 acting between the gimbal or rotor housing 35 and the casing 39. This is accomplished by one of the bellows for example 55 pressing a volume of the gas and exhaling it through an orifice while the other bellows, for example, 57, expands a volume of gas and inhales it through an orifice. Each of the bellows 55 and 57 alternately expands and compresses the gas in one complete cycle.

The three-way valve 31, shown in FIGURE 2, may be operable by a command or fluid pressure signal from a suitable control device 58 applied through conduits 58A and 58B so as to selectively render operative a jet reaction controller indicated generally by the numeral 59 or an aerodynamic servo indicated generally by the numeral 60. Thus, the operation of the three-way valve 31 may select the mechanism to be effective in controlling the aircraft or outer space vehicle by applying a flow of controlling hot gas so as to operate the appropriate controller 59 or 60.

The gas driven rate gyroscope 30, as heretofore explained, includes the rotor 40 which spins on gas bearings 42 at extremely high rates of speed of, for example, 120,000 r.p.m. so as to provide a necessary flight orientation (single axis) signal to the compensated control mechanism 54. The control mechanism 54 includes, as hereinafter explained, a filter arrangement which may filter or "wash out" the low frequency steady-state rate signals associated with a turn maneuver of the aircraft or outer space vehicle and a flapper servo valve amplifier.

The output of the compensated control mechanism 54 provides a differential pressure output signal which is applied so as to control the reaction controller 59 and the aerodynamic servo 60, as hereinafter explained.

The jet reaction controller 59 may be include an automatic proportional type of gas metered thrust chamber and two opposed nozzles 62 and 63 so arranged that each chamber may produce a thrust of, for example, one hundred pounds. The aerodynamic surface controller 60 may include a servo valve 61 of a four-way proportional type having a weight flow rate proportional to the input with a constant supply pressure and controlled by differential pressure output signals from the control mechanism 54 applied to control bellows 62 and 63. The output of this valve 61 is applied to a rotary expansion vane type motor 64 which drives a mechanical transmission 65. This transmission 65 is mechanically connected by an arm 66 and linkage 67 to the aerodynamic control surfaces, not shown, of the aircraft or outer space vehicle and leading from the arm 67 is a position feedback linkage 68 to reposition to valve 61 with changes in the position of the arm 67 and the aerodynamic control surfaces operatively positioned thereby.

*Control mechanism*

As shown schematically in FIGURE 1, the output conduits 51 and 53 lead from the jet pipe receiver orifices 37 and 38, respectively, to input lines 70 and 72 of the control mechanism 54 which are in turn connected to dead-ended chambers 80 and 82 of identical structure and having rigid walls except for walls defined by flexible diaphragms 83 and 85, respectively.

The diaphragms 83 and 85 separate the dead-ended chambers 80 and 82 from the interior of flexible bellows 87 and 89 arranged in balanced relation and operatively connected at 91 to lever arm 93.

The bellows 87 and 89 provide interiorly thereof variable volumes 95 and 97, respectively, and opening into the interiors of the bellows 87 and 89 are capillary tubes 100 and 102 which in the copending U.S. Patent No. 3,180,592 were shown as leading to and from the interior of the sealed casing 39 of the gyro 30 so as to connect to the interior of the bellows 87 and 89 a substantially constant pressure source of hot gaseous fluid pressure medium.

However, in the present invention, the capillary tubes 100 and 102 are connected to the output stage signal ports 134 and 120 through restrictions 101 and 103, respectively. The capillary tubes 100 and 102 are further interconnected by a conduit 98 having a variable restriction 99 which may be adjustably positioned by the operator to vary the gain of an inverse, negative or degenerative feedback path provided by the capillary tubes 100 and 102, as hereinafter explained in greater detail.

As shown schematically in FIGURE 1, the lever arm 93 of the control mechanism 54 is pivotally mounted on a fulcrum 104 which may be adjustably positioned in a suitable manner by the operator to provide various selected mechanical advantages. The lever arm 93 is adjustably positioned about the fulcrum 104 as so to control the position of a flapper valve 110 relative to suitable fluid pressure orifices 112 and 114 to cause a pressure change to occur in the chamber between the valve orifice 112 and a restricted orifice 116 leading through a conduit 118 to the source of fluid pressure medium applied through conduit 28. The change in the differential pressure applied in the chamber between the valve orifice 112 and the restricted orifice 116 is in turn applied through a conduit 120 to a suitable bellows 122 to effect a control function, as shown diagrammatically in the system of FIGURES 1 and 2.

The adjustment of the flapper valve 110 relative to the valve orifice 112 will effect in an opposite sense the valve orifice 114 to cause in turn a pressure change in an opposite sense in the chamber between the valve orifice 114 and a restricted orifice 130 leading through conduit 132 to the source of fluid pressure medium applied through conduit 28. The change in the differential pressure applied in the chamber between the valve orifice 114 and the restricted orifice 130 is in turn applied through a conduit 134 to a suitable bellows 136 so as to act with the bellows 122 to control the position of a pivotal arm 140 to effectively control the jet reaction controller 59. Similarly the differential pressure signals applied through the output lines 120 and 134 of the control mechanism 54 are effective to control the differential control bellows 62 and 63 of the servo valve 61 of the aerodynamic servo 60 for positioning aerodynamic surfaces of the aircraft or outer space vehicle as well as the jet reaction controller 59 for controlling the attitude of the aircraft or outer space vehicle.

In the operation of the control mechanism 54, upon a differential pressure signal being applied through output conduits 51 and 53 of the rate gyroscope 30 by the displacement of the position of the jet pipe nozzle 32 relative to the receiver orifices 37 and 38, this differential pressure signal will cause a change in the volume of chambers 80 and 82 due to the resulting deflection in opposite senses of diaphragms 83 and 85. The resulting displacement of the diaphragms 83 and 85 will in turn then cause a change in the volumes 95 and 97 of the bellows 87 and 89, respectively, which in turn will act through the fluid gaseous medium within the bellows 87 and 89 to effect a displacement of the bellows 87 and 89 in opposite senses and a resulting displacement thereby of the lever arm 93 to cause in turn the flapper valve 110 to be so adjusted relative to the valve orifices 112 and 114 as to effect through the flapper valve controlled system an adjustment of the control arm 140 of the reaction controller 59 and the servo control valve 61 of the areodynamic servo 60 to provide the desired control function.

The respective changes in opposite senses in the pressure of the fluid medium in the volumes 95 and 97 will also cause a restricted flow of fluid medium through the capillary tube 100 in one sense and a restricted flow of fluid medium through the capillary tube 102 in an opposite sense until a steady-state condition has been effected. The resulting adjustment of the lever arm 93 and flapper valve 110 will in turn cause a differential pressure change in the flapper system and differential pressure signal applied to the output lines 120 and 134 to control suitable mechanism on the aircraft or outer space vehicle such as the aerodynamic servo 60 or gas reaction controller 59 for controlling the flight attitude of the aircraft or vehicle in outer space.

*Operation*

Figure 3:
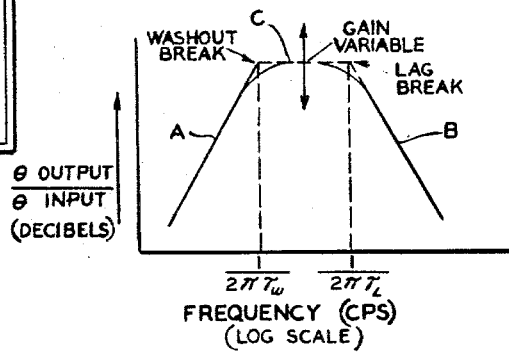
FIGURE 3 is a magnitude ratio diagram illustrating graphically the relationship between the input frequency of the controlling signal and the output gain effected by the control mechanism of FIGURE 1 in the low frequency, intermediate frequency and high frequency signal operating ranges.

In the operation of the system of FIGURES 1 and 2, it will be seen that the control mechanism 54 includes a fluid pressure operated network and signal amplification means which when utilized in the fluid pressure operated flight stabilization system of FIGURES 1 and 2 will perform two required system functions; to wit, the mechanism 54 will fiilter or "wash out" steady-state rate signals associated with a flight turn maneuver of an aircraft or outer space vehicle (low frequency signals) as indicated graphically in FIGURE 3 by the line A and attenuate rate signals arising from structural coupling of the body of the aircraft or outer space vehicle with the rate gyroscope 30 (high frequency signals) as indicated graphically in FIGURE 3 by the line B, while providing high gain output signals in response to input signals applied over a normal intermediate operating range (intermediate frequency signals) as indicated graphically in FIGURE 3 by the line C.

The frictional resistance of the input lines 70 and 72, as well as the capillary lines 100 and 102, together with the flexibility of the diaphragms 83 and 85 and bellows 87 and 89 and the compressibility of the fluid medium in the volumes 95 and 97 under the pressure of the fluid medium applied through the capillary lines 100 and 102 and subject to the changing pressure of the fluid medium applied to the diaphragms 83 and 85 in response to an input signal is such that upon a change in the input signal at the relatively low frequency indicated graphically by the line A of FIGURE 3, the leakage afforded by the capillary tubes 100 and 102 to the changing presure in the volumes 95 and 97 is such as to tend to "wash out" or retard the transfer of the low frequency signals to the lever arm 93. Thus, such low frequency signals have little or no controlling effect on the flapper system so that steady-state rate signals associated with a flight turn maneuver of the aircraft or outer space vehicle or low frequency signals due to poor gyroscope nulls may be effectively eliminated, filtered or washed out.

Moreover, higher frequency signals indicated graphically by the lines C and B of FIGURE 3 are not filtered or "washed out" by the action of the capillary lines 100 and 102, but instead such higher frequency signals are transferred through the diaphragms 83 and 85, pressure medium in the volumes 95 and 97 and bellows 87 and 89 to the lever arm 93.

Furthermore, such signals within the intermediate frequency range indicated graphically by the line C of FIGURE 3 are amplified by the flapper system so as to provide high gain output control signals, while such higher frequency signals coming within the high frequency range indicated graphically by the line B of FIGURE 3, are effectively attenuated. In effecting the latter attenuation, the area of the flapper valve 110 in cooperative relation with the valve orifices 112 and 114 and the frictional resistance of the lines 120 and 134 together with the volume of the controlled bellows 122 and 136 is such that the response thereof to the rapidly changing input signal progressively decreases with an increase in the frequency of such high frequency signals over the range indicated graphically by the line B of FIGURE 3, so as to thereby effectively attenuate and eliminate those extremely high frequency rate signals arising from structural coupling of the body of the aircraft or outer space vehicle with the rate gyroscope 30.

*Inventive feature*

The present invention relates to improvements in the compensating mechanism described and claimed in the copending U.S. application Serial No. 186,252, and which improvement has been effected by changing the connections of the capillary tubes 100 and 102 from the common source of constant pressure in the casing 39 of the associated rate gyro 30 to the output stage signal ports 120 and 134 in an inverse, negative or degenerative feedback arrangement, as shown in the drawing of FIGURE 1. The arrangement further provides for adjustment of the gain of the feedback path through a conduit 98 and a variable interconnecting orifice provided by adjustment of the restriction 99.

The arrangement is such that the null pressure, for example, at the output signal ports 120 and 134 may have a design value of 307.5 p.s.i.a., numerically equal to the common source of constant pressure of 307.5 p.s.i.a. in the case 39 of the associated rate gyroscope component 30, which source was heretofore used in the arrangement of the aforenoted U.S. application Serial No. 186,252.

However, in the arrangement of the present invention, steady state inequalities in the null signal pressure values at the output signal ports 120 and 134 will act on the output bellows 87 and 89 so as to move the flapper valve 110 of the input stage in a direction to restore equality of the null pressure value at the output stage.

Moreover, the transmission of input signals to the flapper valve 110 is not effected by the proposed connection due to the band pass filter design of the subject device, as heretofore described.

Furthermore, low frequency input signals will be attenuated by the wash out characteristics obtained by venting the bellows cavities 95 and 97 to the present common pressure source at the output signal ports 120 and 134; consequently, these low frequency input signals will not be effected by the equalization of the steady-state inequalities in the null pressure values accomplished by the inverse, negative or degenerative feedback arrangement in the capillary tubes 100 and 102.

Moreover, high frequency input signals will be isolated from the present common pressure source at the output signal ports 120 and 134 by the fluid resistance of the capillary vent tubes 100 and 102. Such high frequency input signals applied to the bellows 87 and 89 will be further isolated from variable output signal pressures at the output signal ports 120 and 134 by the fluid resistance of the capillary tubes 100 and 102 in the inverse, negative or degenerative feedback arrangement of the present invention.

From the foregoing, it will be seen that there has been provided in the present invention a control device in which the cavities of the bellows 87 and 89 in an input stage of the control devce are pressurized through suitable capillary tubes 100 and 102 connected to output stage signal ports 134 and 120, respectively, in an inverse, negative or degenerative feedback arrangement such as to cause the bellows 87 and 89 to actuate the flapper valve 110 of the control device so as to effectively compensate for steady-state inequalities in the null pressure values in the output stage of the control device as well as to provide the additional function of serving to filter or "wash out" steady state rate signals (low frequency signals) acting on the input stage, such as might be associated with a flight turn maneuver of an aircraft or outer space vehicle.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is clamed is:

1. A fluid pressure operated controller mechanism comprising, in combination, a signal transmitting means, fluid pressure signal output means controlled by said signal transmitting means, a pair of balanced pressure transmitting bellows operatively connected to the signal transmitting means, diaphragm means sensitive to input signals and operatively associated with each bellows, a pair of capillary tubes operatively connecting said bellows to sad fluid pressure signal output means in a degenerative fluid pressure feedback so arranged as to cause said pair of bellows to actuate said signal transmitting means so as to correct for steady state inequalities in null pressure values at said fluid pressure signal output means, fluid conduit means interconnecting said capillary tubes, and adjustable means for variably restricting said fluid conduit means so as adjust the gain of the fluid pressure feedback.

2. A fluid pressure operated controller mechanism comprising, in combination, a fluid pressure signal transmitting means, a pair of balanced pressure bellows operatively connected to the signal transmitting means, diaphragm means sensitive to input signals, fluid pressure means to operatively associate each bellows to said diaphragm means so as to transmit input signals applied to said diaphragm means to each of said bellows, capillary tube means operatively connecting said fluid pressure means to an output fluid pressure signal stage of the signal transmitting means so as to provide a feedback arrangement for rendering said fluid pressure means effective to act on said signal transmitting means so as to correct for steady state input inequalities in null pressure values in the output stage of the fluid pressure signal transmitting means, and said capillary tube means rendering said fluid pressure means ineffective to transmit input signals of a low frequency range from said diaphragm means to said bellows, and said capillary tube means including a variable orifice, and an operator-operative adjustment means for varying said orifice to adjust the gain of the feedback arrangement provided by said capillary tube means.

3. A fluid pressure operated controller mechanism comprising, in combination, a fluid pressure signal transmitting means including a pair of output fluid pressure signal ports, a pair of balanced pressure transmitting bellows operatively connected to the signal transmitting means for controlling the output fluid pressure signal ports, diaphragm means sensitive to input signals, fluid pressure means to operatively associate each bellows to said diaphragm means so as to transmit input signals applied to said diaphragm means to said bellows, and a capillary tube operatively connecting said fluid pressure means to a substantially constant fluid pressure source at said output fluid pressure signal ports so so to render said fluid pressure means ineffective to transmit input signals of a low frequency range from said diaphragm means to each of said bellows, a first capillary tube to operatively connect the fluid pressure means in one of said bellows to one of said pair of output fluid pressure signal ports of the signal transmitting means, a second capillary tube operatively connecting said fluid pressure means in the other of said bellows to another of said pair of output fluid pressure signal ports of the signal transmitting means, and said first and second capillary tubes being so arranged as to provide a fluid pressure feedback to the fluid pressure means in each of said bellows so as to render said fluid pressure means effective to cause said bellows to act on the signal transmitting means in such a manner as to compensate for steady-state inequalities in the null pressure values in the output fluid pressure signal ports of the signal transmitting means.

4. A fluid pressure operated controller mechanism comprising, in combination, a fluid pressure signal transmitting means including a pair of output fluid pressure signal ports, a pair of balanced pressure transmitting means, diaphragm means sensitive to input signals, fluid pressure means to operatively associate each bellows to said diaphragm means so as to transmit input signals applied to said diaphragm means to each of said bellows, first and second capillary tubes operatively connecting said fluid pressure means to a substantially constant fluid pressure source at said output fluid pressure signal ports so as to render said fluid pressure means ineffective to transmit input signals of a low frequency range from said diaphragm means to each of said bellows, and the said first and second capillary tubes being so arranged as to provide a negative fluid pressure feedback operatively connecting the output fluid pressure signal ports to the fluid pressure means in each of said bellows so as to render said fluid pressure means effective to correct for steady state inequalities in null signal fliud pressure values at said output fluid pressure signal ports.

References Cited by the Examiner
UNITED STATES PATENTS

| | | | |
|---|---|---|---|
| 2,104,627 | 1/1938 | Von Manteuffel | 244—78 |
| 3,071,337 | 1/1963 | Harcum | 244—78 |
| 3,101,650 | 8/1963 | Blanton | 91—433 |
| 3,180,592 | 4/1965 | Jeye et al. | 244—78 |

MILTON BUCHLER, *Primary Examiner.*

ANDREW H. FARRELL, *Examiner.*